United States Patent
Zhang

(10) Patent No.: US 11,409,285 B2
(45) Date of Patent: Aug. 9, 2022

(54) METHOD FOR MANEUVER PREDICTION OF TRAFFIC PARTICIPANT

(71) Applicant: Continental Automotive Systems, Inc., Auburn Hills, MI (US)

(72) Inventor: Xian Zhang, Shelby Township, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 279 days.

(21) Appl. No.: 16/688,603

(22) Filed: Nov. 19, 2019

(65) Prior Publication Data

US 2020/0209860 A1 Jul. 2, 2020

Related U.S. Application Data

(60) Provisional application No. 62/785,339, filed on Dec. 27, 2018.

(51) Int. Cl.
*G05D 1/00* (2006.01)
*G05D 1/02* (2020.01)
*G06N 3/04* (2006.01)

(52) U.S. Cl.
CPC ......... *G05D 1/0088* (2013.01); *G05D 1/0212* (2013.01); *G05D 1/0231* (2013.01);
(Continued)

(58) Field of Classification Search
CPC .. G05D 1/0088; G05D 1/0212; G05D 1/0231; G05D 1/0276; G05D 2201/0213; G06N 3/0445
See application file for complete search history.

(56) References Cited

U.S. PATENT DOCUMENTS

2005/0222764 A1* 10/2005 Uyeki ................ G01C 21/3415
701/414
2013/0054106 A1 2/2013 Schmudderich et al.
(Continued)

FOREIGN PATENT DOCUMENTS

EP 2549456 A1 1/2013
EP 2990290 A1 3/2016
(Continued)

OTHER PUBLICATIONS

International Search Report and the Written Opinion of the International Searching Authority dated Apr. 6, 2020 for the counterpart PCT Application No. PCT/2019/066289.

*Primary Examiner* — Calvin Cheung

(57) ABSTRACT

A method and system for navigating traffic for an autonomously controllable vehicle operates by detecting at least one target vehicle within a traffic environment with at least one sensor disposed on a primary vehicle. The system obtains information with a plurality of sensors disposed on the primary vehicle of the traffic environment and the at least target vehicle and predicts a maneuver of the at least one target vehicle with a controller disposed on the primary vehicle for a future time based on the information obtained relating to the traffic environment and the at least one target vehicle. The system further generates a recommended path for the primary vehicle with the controller that avoids conflicts with a future position of the at least one target vehicle based on predicted maneuvers of the at least one target vehicle.

18 Claims, 3 Drawing Sheets

(52) U.S. Cl.
CPC ......... *G05D 1/0276* (2013.01); *G06N 3/0445* (2013.01); *G05D 2201/0213* (2013.01)

(56) References Cited

U.S. PATENT DOCUMENTS

| | | | |
|---|---|---|---|
| 2014/0114556 A1* | 4/2014 | Pan ...................... | G08G 1/0112 |
| | | | 701/119 |
| 2017/0278402 A1* | 9/2017 | Yalla ................... | G01C 21/3602 |
| 2017/0336788 A1* | 11/2017 | Iagnemma ........... | G05D 1/0246 |
| 2018/0154899 A1 | 6/2018 | Tiwari et al. | |
| 2019/0379589 A1* | 12/2019 | Ryan ...................... | G06N 3/082 |

FOREIGN PATENT DOCUMENTS

| | | |
|---|---|---|
| WO | 2016156236 A1 | 10/2016 |
| WO | 2017044525 A1 | 3/2017 |

\* cited by examiner

METHOD FOR MANEUVER PREDICTION OF TRAFFIC PARTICIPANT

CROSS-REFERENCE TO RELATED APPLICATION

This application claims priority to U.S. Provisional Application No. 62/785,339 filed on Dec. 27, 2018.

TECHNICAL FIELD

The present disclosure relates to a system and method for predicting maneuvers of surrounding vehicles and traffic participants to aid autonomous vehicle operation.

BACKGROUND

Vehicles capable of operating autonomously includes sensors that provide data and enable reactions to maneuvers by surrounding vehicles and other traffic participants. Reacting to current actions of surrounding vehicles can limit maneuver operations and may include some inaccuracy due to uncertainty as to the intentions of other vehicles. Moreover, reacting to maneuvers of other vehicles after they occur can limit options and result in inefficiencies.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of navigating traffic for an autonomously controllable vehicle according to an example embodiment of this disclosure includes, among other possible things the step of detecting at least one target vehicle within a traffic environment with at least one sensor disposed on a primary vehicle, obtaining information with a plurality of sensors disposed on the primary vehicle of the traffic environment and the at least target vehicle, predicting a maneuver of the at least one target vehicle with a controller disposed on the primary vehicle for a future time based on the information obtained relating to the traffic environment and the at least one target vehicle and generating a recommended path for the primary vehicle with the controller that avoids conflicts with a future position of the at least one target vehicle based on predicted maneuvers of the at least one target vehicle.

A further embodiment of the foregoing method of navigating traffic for an autonomously controllable vehicle wherein the step of obtaining information on the traffic environment includes generating a local region feature map from images captured by cameras disposed on the primary vehicle.

A further embodiment of any of the foregoing methods of navigating traffic for an autonomously controllable vehicle wherein predicting the maneuver of the at least one target vehicle includes utilizes a recurrent neural network that utilizes information obtained about the traffic environment and the local region feature map to predict possible positions and maneuvers of the at least one target vehicle.

A further embodiment of any of the foregoing methods of navigating traffic for an autonomously controllable vehicle wherein the recurrent neural network predicts possible positions and maneuvers of the at least one target vehicle for a plurality of future times.

A further embodiment of any of the foregoing methods of navigating traffic for an autonomously controllable vehicle wherein the information relating to the traffic environment includes information relating to a spatial relationship between the primary vehicle and the at least one target vehicle.

A further embodiment of any of the foregoing methods of navigating traffic for an autonomously controllable vehicle wherein the information relating to the traffic environment includes information relating to a spatial relationship between the at least one target vehicle and other traffic participants.

A further embodiment of any of the foregoing methods of navigating traffic for an autonomously controllable vehicle wherein the information relating to the traffic environment includes information relating to a spatial relationship between the at least one target vehicle and boundaries of a roadway.

A further embodiment of any of the foregoing methods of navigating traffic for an autonomously controllable vehicle wherein the information relating to the traffic environment includes information obtained directly from the at least one target vehicle.

A further embodiment of any of the foregoing methods of navigating traffic for an autonomously controllable vehicle wherein the primary vehicle comprises a partially autonomously vehicle that generates operation of the primary vehicle functions to assist in driver operation.

A further embodiment of any of the foregoing methods of navigating traffic for an autonomously controllable vehicle wherein the primary vehicle comprises a fully autonomous vehicle that operates independently.

A vehicle navigation system for navigating an autonomously controllable vehicle within a traffic environment according to another disclosed example embodiment includes, amount other possible things, a detection module for obtaining information on proximate traffic participants, a local region feature map that is continually update based on information from the detection module, a recurrent neural network for generating a plurality of predicted possible future positions for at least one traffic participant at a plurality of future time steps and a vehicle controller for generating commands to alter a path of the vehicle based on the plurality of predicted future positions of the at least one traffic participants.

In a further embodiment of the foregoing vehicle navigation systems, the vehicle detection module comprises a camera that captures images of the at least one traffic participant, other stationary and non-stationary objects surrounding a vehicle.

In a further embodiment of any of the foregoing vehicle navigation systems, at least one sensor providing information indicative of vehicle operation within the traffic environment.

In a further embodiment of any of the foregoing vehicle navigation systems, the vehicle controller is configured to detect relationships between the at least one traffic participant and other traffic participants.

In a further embodiment of any of the foregoing vehicle navigation systems, the at least one traffic participant includes a first vehicle and the vehicle controller is configured to detect a position of the first vehicle within boundaries of a roadway.

In a further embodiment of any of the foregoing vehicle navigation systems, the vehicle controller detects actions directly from the first vehicle that are indicative of a future maneuver.

In a further embodiment of any of the foregoing vehicle navigation systems, the vehicle controller generates is part of a partially autonomous vehicle and generates operation of vehicle functions to assist in driver operation.

In a further embodiment of any of the foregoing vehicle navigation systems, the vehicle controller generates commands for primary vehicle comprises a fully autonomous vehicle that operates independently.

These and other features disclosed herein can be best understood from the following specification and drawings, the following of which is a brief description.

DETAILED DESCRIPTION

Figure 1:
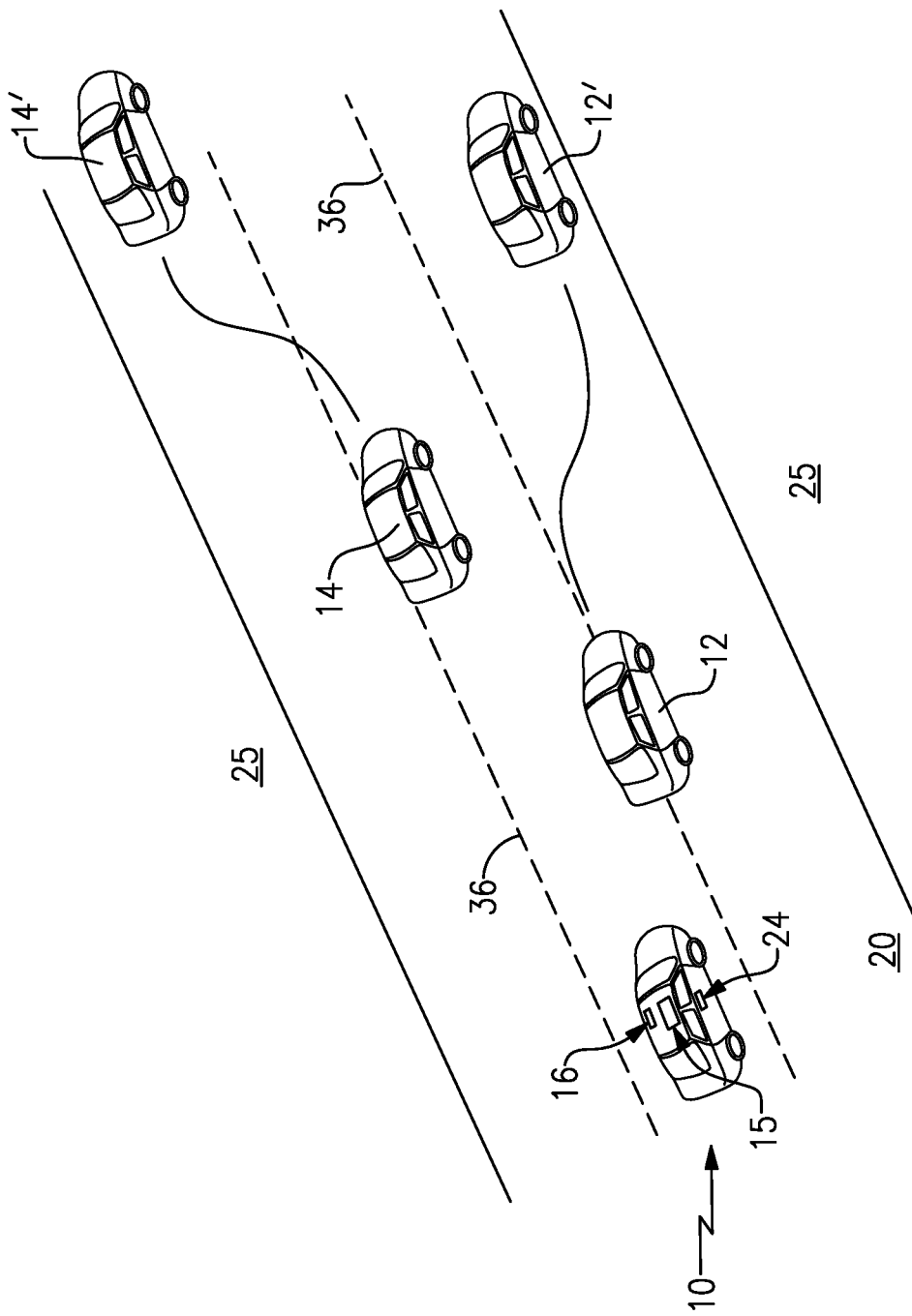
FIG. 1 is a schematic view of an example vehicle including an example navigation system within a traffic environment.

Referring to FIG. 1, a primary vehicle 10 includes a system 15 that evaluates the operation of surrounding traffic participants such as vehicles 12, 14 and predicts potential maneuvers executed by the other vehicles 12, 14. The primary vehicle 10 includes a camera 16 and radar device 24 for obtaining information indicative of at least one surrounding vehicle and/or traffic participant. It should be appreciated that other sensing devices that provide information about surrounding traffic participants could be utilized and are within the context of this disclosure.

The primary vehicle 10 uses the predictions to take predictive action and define a path to avoid unintended delays, improve occupant comfort and provide improved traffic management. Moreover, the resulting path may avoid accidents by predicting potential undesired intersections of paths with other traffic participants. The disclosed system 15 extracts data indicative of traffic context along a roadway 20 and shoulders 25 proximate the roadway by combining information from many different sensors systems within the vehicle 10, the other vehicles 12, 14 and static structures. The combined information from sensors within the traffic environment are used to build a feature map of an image region corresponding to the target vehicles 12, 14, and is combined in a Recurrent Neural Network (RNN) to predict possible maneuvers and paths of the target vehicles 12, 14 at future time steps [t0, t1, t2, . . . , tn] as indicated at 12', 14'.

Figure 2:
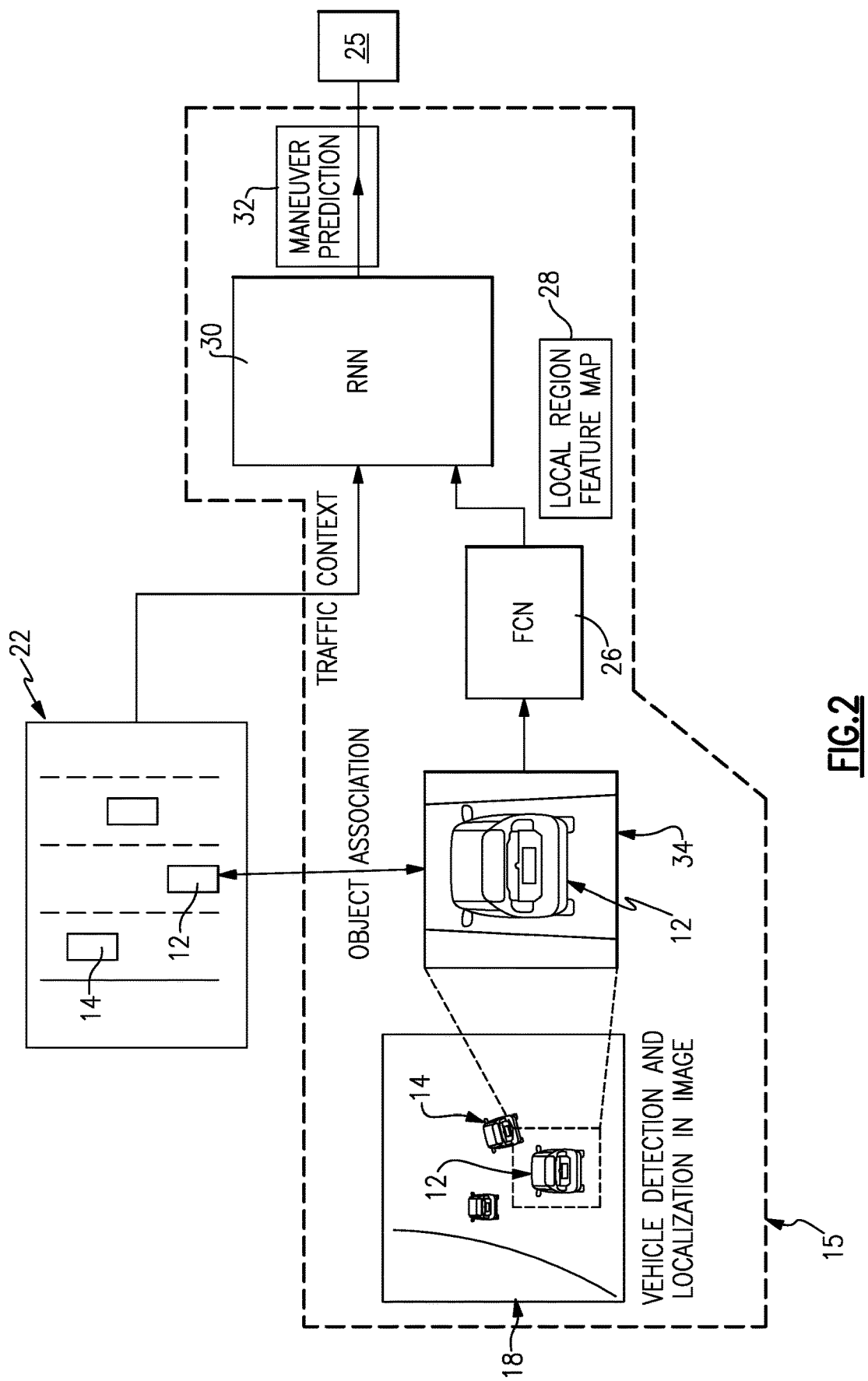
FIG. 2 is a schematic view of an example vehicle navigation system for autonomous driving.

Referring to FIG. 2, with continued reference to FIG. 1, example disclosed system 15 is provided in the primary vehicle 10. The system 15 maybe implemented as software directing control of a vehicle controller 25. The system 15 may also be provide as a separate system that uses information from sensors and other detection devices already provided with the vehicle. The vehicle 10 may be a fully autonomous vehicle, partially autonomous vehicle or include features that assist in driver operation.

The vehicle 10 gathers and uses information obtained regarding existing traffic context schematically indicated at 22 to generate a desired path. The traffic context 22 is the relationship between the target vehicles 12, 14 and other traffic participants, stationary and/or non-stationary, and the roadway 20. The traffic context 22 is obtained in one example embodiment by processing output from sensor fusion modules. The sensor fusion modules gather and fuse object information, lane information, and road edge information from various different input sources, such as radar 24, camera 16, and a map/localization module for use by predictive models and networks to define and/or alter a path of the vehicle 10.

The example disclosed system 15 generates a local region feature map 28 from data gathered related to the traffic context 22 and images 18 captured of the target vehicles 12, 14. The example images 18 are obtained from a detection system. In this example the detection system comprises a camera 16 provided in the primary vehicle 10. The local region feature map 28 is generated using two main steps. An example first step includes obtaining the local region feature map from raw camera images 18. A computer vision technique is applied to the raw camera images 18 for enabling the detection and localization of vehicles 12, 14 in the captured images as is schematically indicated at 34. The image region of the target vehicle 12 of interest is constructed as a fully convolution network (FCN) 26 that is composed of all convolutional layers, in this case, without transposed conversion layers. The FCN 26 is employed to extract the feature map 28 that includes information directly related to the other target vehicles 12, 14.

The information is obtained and used to generate the fully convolution network 26 that is utilized by a recurrent neural network 30 (RNN). The RNN 30 provides a maneuver prediction 32 for each of the target vehicles 12, 14 and communicates those predictions to the vehicle controller 25. The vehicle controller 25 uses the predictions 32 to alter vehicle operation to accommodate and account for potential target vehicle movement.

The traffic context information 22 and the local region feature map 28 are fed to the trained RNN 30 to infer the future maneuver of the target vehicles 12, 14. Examples of information ascertained and utilized by the RNN 30 include how far/close the target vehicle 12, 14 is from left and right lane markers 36 and/or shoulders 25 as well as information obtained directly from the target vehicles 12, 14 such as what turn signal is actuated.

Previous systems rely on lateral kinematic information of the target vehicle relative to the lane to assist inferring possible future maneuvers. However, even with sensor fusion, the lateral kinematic information and the lane estimation provide unclear information and algorithms based on such "direct indicators" are susceptible to false positive errors. In contrast, the disclosed system and method leverages machine learning techniques to directly extract information (e.g., how far/close the vehicle is away from the lane markers 36) from the raw camera image 18. The raw camera footage 18 is utilized directly instead of processing the object and lane information separately and then combining. Accordingly, the example system 15 greatly reduces uncertainties. Also, with the method proposed in this disclosure, even the more abstract information related to the driver intention such as the turn signal can be extracted and included in the feature map 28 to further enhance the robustness of predictions from the system 15.

Figure 3:
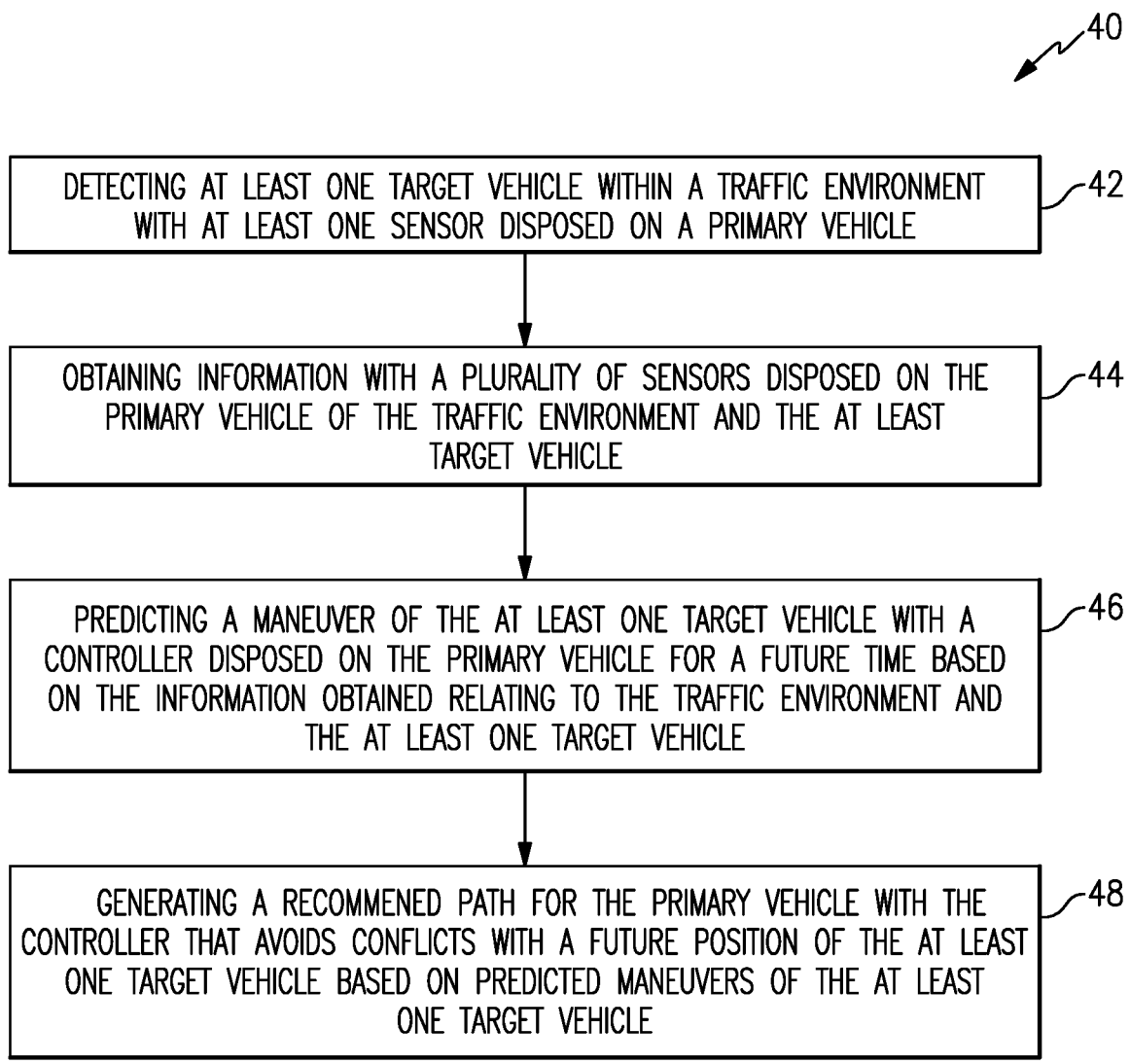
FIG. 3 is a flow diagram illustrating example navigation steps for a vehicle utilizing an example navigation system embodiment.

Referring to FIG. 3, with continued reference to FIGS. 1 and 2, an example embodiment of a disclosed method is schematically shown at 40. The example method 40 begins by detecting at least one target vehicle 12, 14 within a traffic environment 22 with at least one sensor 16, 24 disposed on a primary vehicle 10. The detecting of other traffic participants includes detecting other vehicles forward and behind and to the side of the primary vehicle 10. Detection is provided with sensors and camera as are known and installed within the primary vehicle 10. Specific information is obtained with the sensors 16, 24 as indicated at 44. The specific information can include the current position relative other traffic participants, within the roadway 20, lane markers 36 and road shoulder 25. Moreover, information directly from the other vehicles 12 is gathered. Information directly from the other vehicles 12, 14 can include turn signal actuation and brake actuation. The images of the other vehicles 12, 14 are processed such that operation directly from the other vehicle is obtained and utilized. The gathered information is used to predict maneuvers of the other vehicles 12, 14 and traffic participants as is indicated at 46. In this example embodiment, the system 15 is implemented in the vehicle controller 25 as modules and instructions that generate actionable information that is used for controlling the primary vehicle 10. In this example embodiment, the RNN 30 is utilized to predict at least one and/or a plurality of maneuvers of the other vehicles for at least one future time. In practice, the RNN 30 predicts a plurality of paths for future times that is constantly updated based on changes in sensed conditions and narrowed until a single predicted a path is most likely. Alternate paths are still determined. Once the paths of the other vehicles 12, 14 are understood and predicted, the example system 15 generates a recommend path for the primary vehicle 10 as is indicated at 48. The predicted path is determined to avoid conflicts with a future position of the other vehicles 12, 14 and is based on the information gathered and continually updated in the previous steps.

The example system 15 and method provides increased resolution of the prediction result. Prior systems may only predict a likely future maneuver of the TPO within a limited time range, for example a lane change to the left within the next 2 seconds. The example system is capable of predicting a probability of traffic participant maneuvers at future time steps [t0, t1, t2, . . . , tn] due to the variable size of output of the recurrent neural network.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A method of navigating traffic for an autonomously controllable vehicle, the method comprising:
    detecting at least one target vehicle within a traffic environment with at least one sensor disposed on a primary vehicle;
    obtaining information with a plurality of sensors disposed on the primary vehicle of the traffic environment and the at least target vehicle;
    predicting a maneuver of the at least one target vehicle with a controller disposed on the primary vehicle for a future time based on the information obtained relating to the traffic environment and the at least one target vehicle; and
    generating a recommended path for the primary vehicle with the controller that avoids conflicts with a future position of the at least one target vehicle based on predicted maneuvers of the at least one target vehicle, wherein obtaining information on the traffic environment includes generating a local region feature map of an image region corresponding to the at least one target vehicle from images captured by cameras disposed on the primary vehicle, and
    wherein predicting the maneuver of the at least one target vehicle includes utilizing a recurrent neural network that receives information obtained about the traffic environment and the local region feature map to predict possible positions and maneuvers of the at least one target vehicle.

2. The method as recited in claim 1, wherein the recurrent neural network predicts possible positions and maneuvers of the at least one target vehicle for a plurality of future times.

3. The method as recited in claim 1, wherein the information relating to the traffic environment includes information relating to a spatial relationship between the primary vehicle and the at least one target vehicle.

4. The method as recited in claim 1, wherein the information relating to the traffic environment includes information relating to a spatial relationship between the at least one target vehicle and other traffic participants.

5. The method as recited in claim 1, wherein the information relating to the traffic environment includes information relating to a spatial relationship between the at least one target vehicle and boundaries of a roadway.

6. The method as recited in claim 1, wherein the information relating to the traffic environment includes information obtained directly from the at least one target vehicle.

7. The method as recited in claim 1, wherein the primary vehicle comprises a partially autonomously vehicle that generates operation of the primary vehicle functions to assist in driver operation.

8. The method as recited in claim 1, wherein the primary vehicle comprises a fully autonomous vehicle that operates independently.

9. The method of claim 1, wherein generating the local region feature map employs a fully convolutional network to extract the local region feature map.

10. A vehicle system navigation system for navigating an autonomously controllable vehicle within a traffic environment comprising:
    a detection module for obtaining information on proximate traffic participants;
    a local region feature map that is continually updated based on information from the detection module;
    a recurrent neural network for generating a plurality of predicted possible future positions for at least one traffic participant at a plurality of future time steps based at least partly on the local region feature map; and
    a vehicle controller for generating commands to alter a path of the vehicle based on the plurality of predicted future positions of the at least one traffic participants.

11. The system as recited in claim 10, wherein the vehicle detection module comprises a camera that captures images of the at least one traffic participant, other stationary and non-stationary objects surrounding a vehicle.

12. The system as recited in claim 11, including at least one sensor providing information indicative of vehicle operation within the traffic environment.

13. The system as recited in claim 11, wherein the vehicle controller is configured to detect relationships between the at least one traffic participant and other traffic participants.

14. The system as recited in claim 13, wherein the at least one traffic participant includes a first vehicle and the vehicle controller is configured to detect a position of the first vehicle within boundaries of a roadway.

15. The system as recited in claim 14, wherein the vehicle controller detects actions directly from the first vehicle that are indicative of a future maneuver.

16. The system as recited in claim 10, wherein the vehicle controller generates is part of a partially autonomous vehicle and generates operation of vehicle functions to assist in driver operation.

17. The system as recited in claim 10, wherein the vehicle controller generates commands for primary vehicle comprises a fully autonomous vehicle that operates independently.

18. The system of claim 10, further comprising a fully convolutional network which extracts the local region feature map as an output of the fully convolutional network based on the information from the detection module, the local region feature map being provided as input to the recurrent neural network.

\* \* \* \* \*